July 9, 1929.   W. A. GEIGER   1,720,175
ROLLER SIDE BEARING
Filed Dec. 21, 1923

Witnesses
Hans M. Raehlitz

Inventor
William A. Geiger
By George J. Haight
His Atty.

Patented July 9, 1929.

1,720,175

UNITED STATES PATENT OFFICE.

WILLIAM A. GEIGER, OF CHICAGO, ILLINOIS, ASSIGNOR, BY MESNE ASSIGNMENTS, TO W. H. MINER, INC., A CORPORATION OF DELAWARE.

ROLLER SIDE BEARING.

Application filed December 21, 1923. Serial No. 681,927.

This invention relates to improvements in roller side bearings.

The object of this invention is to provide an anti-friction bearing especially adapted for railway side bearing use, which bearing comprises but few parts, each of simple design, adapting it for relatively inexpensive manufacture, and wherein the parts are so arranged that the anti-friction element is automatically centered when free from load, under the influence of gravity.

Figure 1:
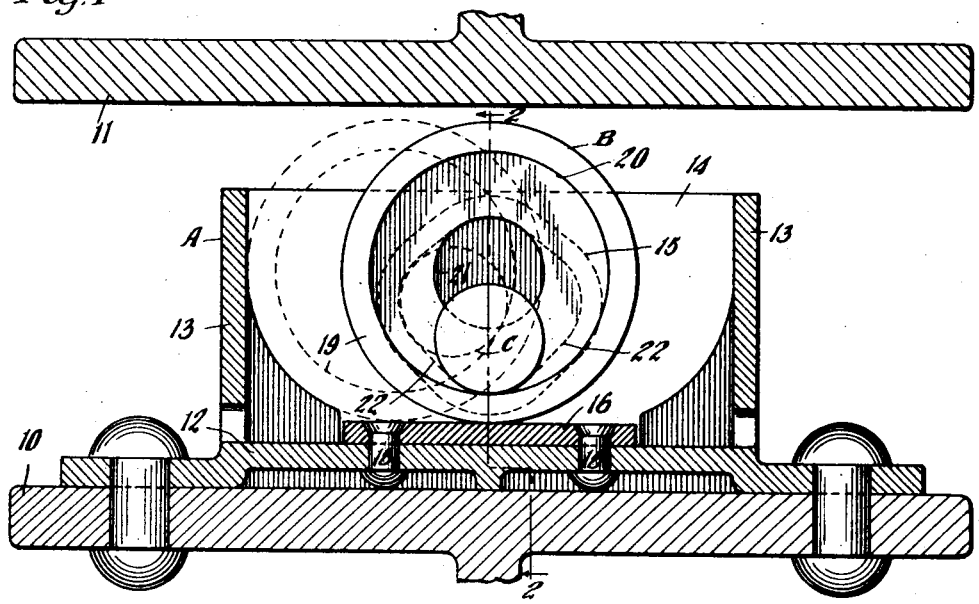
Figure 2:
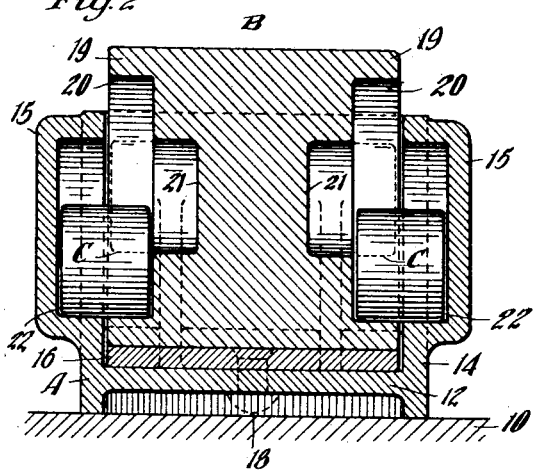

In the drawing forming a part of the specification, Figure 1 is a vertical sectional view taken through the ends of the body and truck bolsters of a car, showing my improvements in connection therewith; and Figure 2 is a vertical transverse sectional view corresponding to the section line 2—2 of Figure 1.

In said drawing, 10 denotes the upper portion of a truck bolster and 11 the under portion of a corresponding opposed body bolster. The improved bearing is shown applied to the truck bolster and comprises, broadly, a base casting, retaining member, or housing A; an anti-friction element proper B; and a pair of counter-weights C.

The housing A is of more or less box-like form, having a bottom wall 12, end walls 13, and side walls 14, the side walls having laterally off-set portions 15 adjacent their centers, for a purpose hereinafter described. A hardened wear plate 16 may be inserted in the bottom of the housing to form a bearing surface therefor, if desired, said wear plate being secured in place by suitable fastenings—as, for instance, by rivets 18.

The anti-friction element B, in the instance shown, is substantially solid and of a true cylindrical form adapted to roll back and forth to either side of its central normal position on the bottom bearing plate 16. This roller is provided with annular flanges 19, at the ends thereof, so as to form end openings or recesses, the inner peripheries of the flanges providing annular raceways 20. Recesses 21 are provided in opposite ends of the anti-friction element, centrally of the large end openings, and extending inwardly thereof, to form pockets to receive the counter-weights, for a purpose to be hereinafter described.

The counter-weights C are of like construction and each is in the form of a cylinder. These disks, or counter-weights, are loosely arranged in the end openings of the anti-friction element so as to move therewith and be carried thereby, and have a rolling movement on said raceways, a portion of each counter-weight projecting longitudinally beyond said element. The laterally off-set portions 15 of the housing or retaining member A are flanged so as to have raceways formed therein to cooperate with the raceways 20 and receive the projecting ends of the counter-weights C therein. It will be noted that the flanges in the portions 15 are made continuous or unbroken, and the lower portions of the raceways are inclined upwardly in both directions from the center, as at 22.

The operation of the device is as follows, assuming a movement of the anti-friction element toward the left, as viewed in Figure 1. As the element B rolls toward the left, the counter-weights C carried thereby will roll upwardly on the inclined surfaces 22 to the position shown in dotted lines in Figure 1, in which position the parts will be in unstable equilibrium, so that when the load is released, the counter-weights will roll down the raceways to their normal central position, thereby bringing the anti-friction element to its normal central position.

In assembling the parts, the counter-weights C are inserted into the central depressions 21 of the anti-friction element, these counter-weights being of such length that they will then be accommodated entirely within the ends of the anti-friction element. Said element, with the counter-weights seated therein, is then dropped into the retaining member, and then said element is tipped, shaken or otherwise moved to throw said counter-weights out of their seats, whereupon they fall into operative position between the opposed openings of the housing and element. When the parts are thus properly assembled, it will be extremely difficult thereafter to disassemble them, either during shipment or while in service, an important factor in preventing tampering or loss of parts.

It will be noted that the anti-friction element is substantially a solid member, and, hence, will be extremely strong and durable under operating conditions.

Although I have herein shown and described what I now consider the preferred manner of carrying out my invention, the same is merely illustrative, and I contemplate all changes and modifications that come within the scope of the claims appended hereto.

I claim:

1. In an anti-friction bearing, the combination with a housing constructed for attachment to a bolster; of an anti-friction element in said housing and adapted for rolling movement to either side of normal central position, said element having raceways on the ends thereof and recesses inwardly of said raceways and communicating therewith; counter-weights loosely carried by said elements to roll on said raceways and of a size to be received in said recesses and lie entirely within the end planes of said element; and means on said housing cooperable with said raceways to elevate the counter-weights when the element is shifted to either side of central position.

2. In an anti-friction bearing, the combination with a housing constructed for attachment to a bolster; of an anti-friction element in said housing and adapted for rolling movement to either side of central position, said element being recessed inwardly from each end to provide annular raceways, each of said recesses being deepened substantially centrally thereof to receive a counter-weight; flanges on said housing, having their lower portions inclined upwardly in both directions from the centers thereof; and counter-weights adapted to be arranged between said element and flanges so as to roll on said raceways and flanges and be elevated by the latter when moved to either side of their normal central positions, said counter-weights being of such size as to lie entirely within the end planes of said element when they are seated in said deepened portions of the recesses in said element.

3. In a side bearing, the combination with a housing constructed for attachment to a bolster and having an imperforate laterally recessed side wall, the bounding bottom edge of said recess being inclined upwardly in both directions from the center; of an anti-friction element adapted to roll in said housing to either side of central position and having a raceway at its end; and a counter-weight arranged between said recess and raceway for movement thereon, said anti-friction element having a recess leading inwardly from said raceway and of such depth that said counter-weight may be initially inserted thereinto with its outer end within said element, when assembling said parts.

4. In a side bearing, the combination with a housing constructed for attachment to a bolster and having an imperforate laterally recessed side wall; of an anti-friction element adapted to roll in said housing to either side of central position and having a recess at its end; and a counter-weight arranged between said recesses for movement therein to center said element, said anti-friction element having a portion of its recess deepened so that said counter-weight may be initially inserted thereinto with its end lying entirely within said element so that said element and counter-weight lying entirely therewithin may be assembled within said housing and said counter-weight thence dislodged from said deepened portion so as to substantially prevent accidental withdrawal of said element from said housing.

In witness that I claim the foregoing I have hereunto subscribed my name this 19th day of December, 1923.

WILLIAM A. GEIGER.